United States Patent [19]

D'Arcy

[11] Patent Number: 5,203,247
[45] Date of Patent: Apr. 20, 1993

[54] VERTICAL MITERING BAND SAW

[76] Inventor: John W. D'Arcy, 20 Austin St., Suffield, Conn. 06078

[21] Appl. No.: 858,636

[22] Filed: Mar. 27, 1992

[51] Int. Cl.⁵ .......................................... B23D 53/04
[52] U.S. Cl. ...................................... 83/794; 83/812; 83/452
[58] Field of Search ................. 83/452, 462, 466, 457, 83/809, 810, 811, 812, 794

[56] References Cited

U.S. PATENT DOCUMENTS

| | | | |
|---|---|---|---|
| 3,452,629 | 7/1969 | Jacobson | 83/812 |
| 3,556,177 | 1/1971 | Cleland | 83/812 |
| 4,658,689 | 4/1987 | Yakich | 83/812 X |
| 5,103,704 | 4/1992 | Spath et al. | 83/452 |

Primary Examiner—Frank T. Yost
Assistant Examiner—Rinaldi Rada
Attorney, Agent, or Firm—Ira S. Dorman

[57] ABSTRACT

A vertical mitering band saw machine utilizes a column integraly formed from steel plate, mounted upon a carriage that is supported by a system of rails and wheels. A unique vise system is provided, as are assemblies for mounting of a blade-carrying pulley so as to permit ready adjustment of blade tension as well as of caster and camber of the pulley.

22 Claims, 10 Drawing Sheets

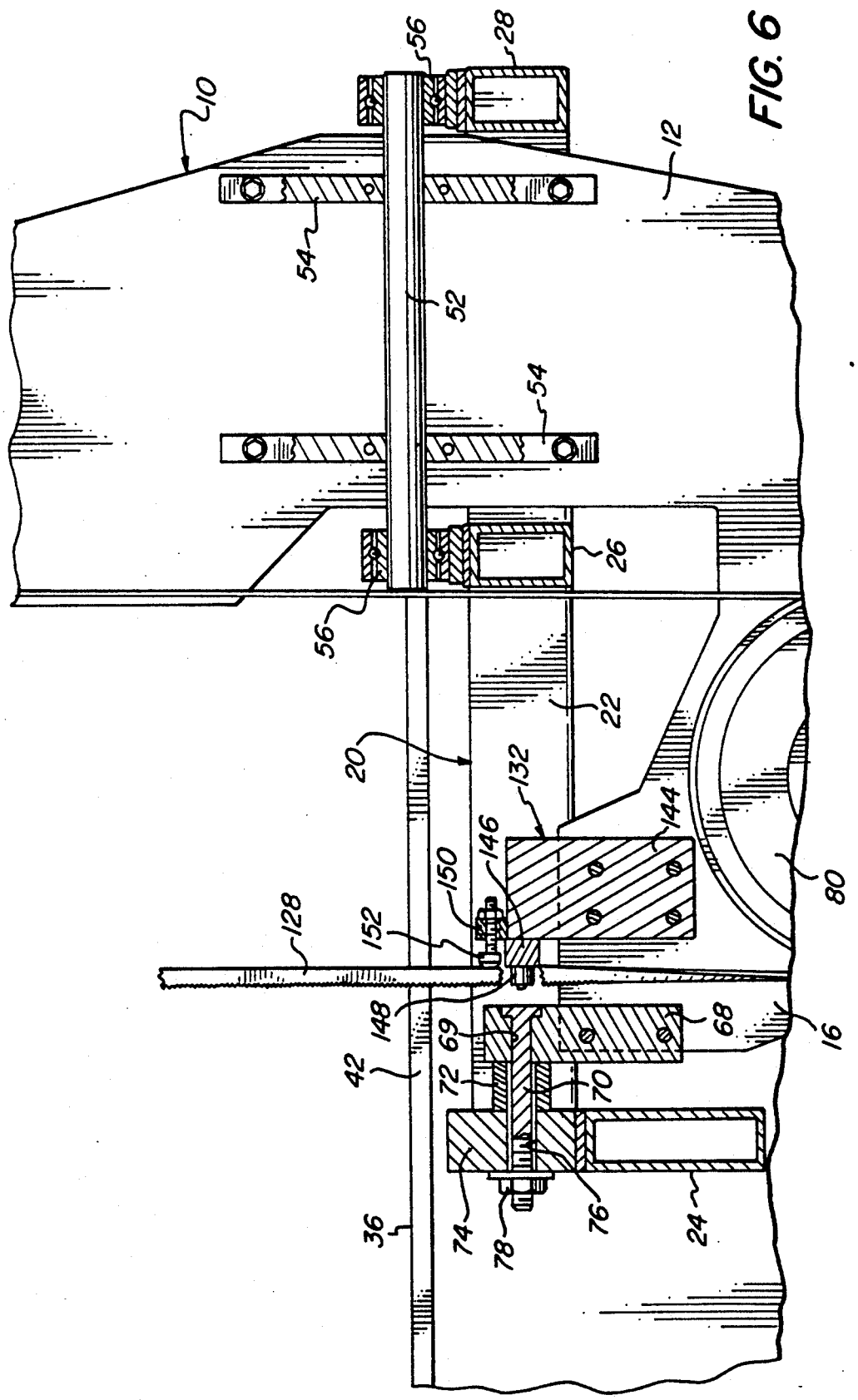

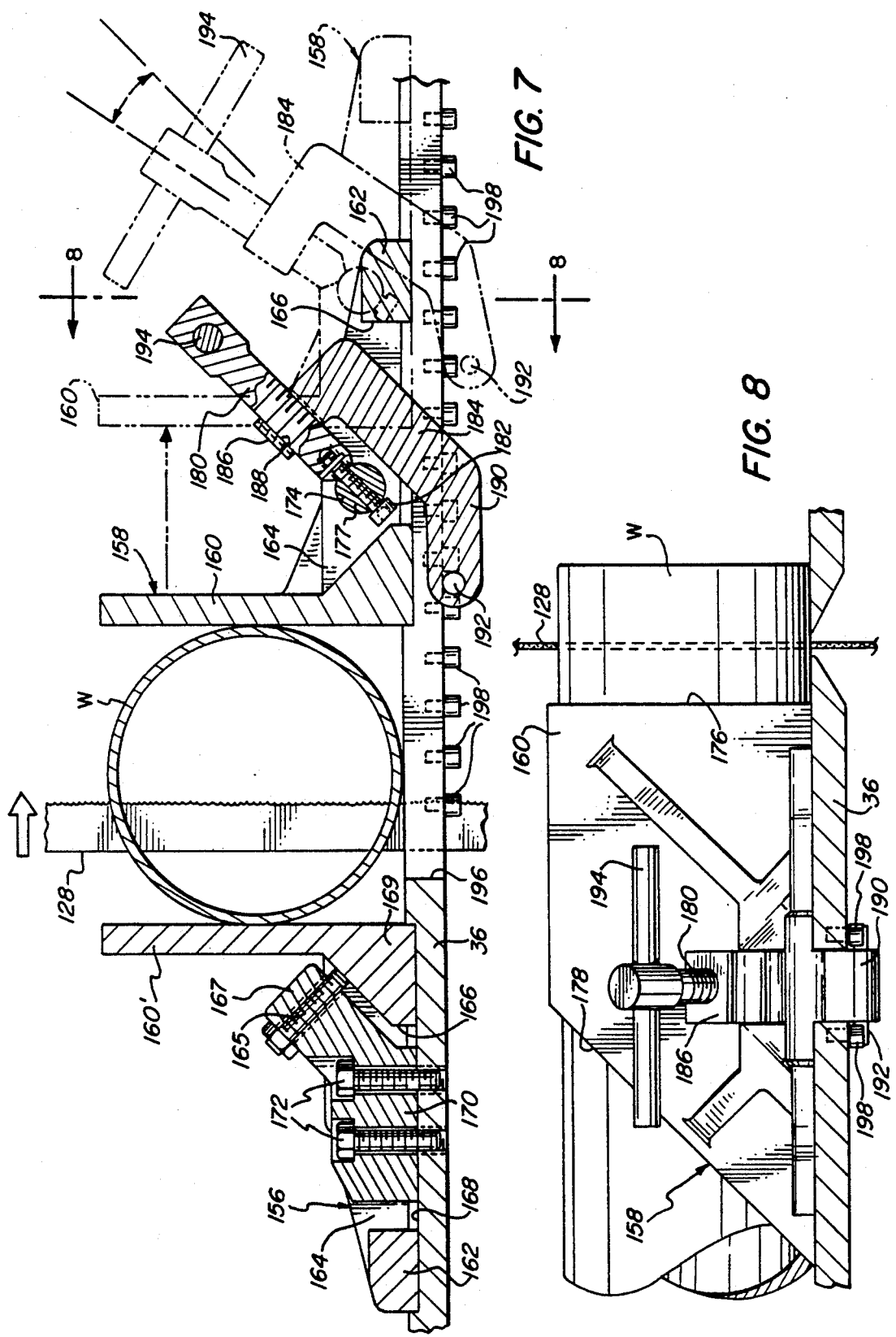

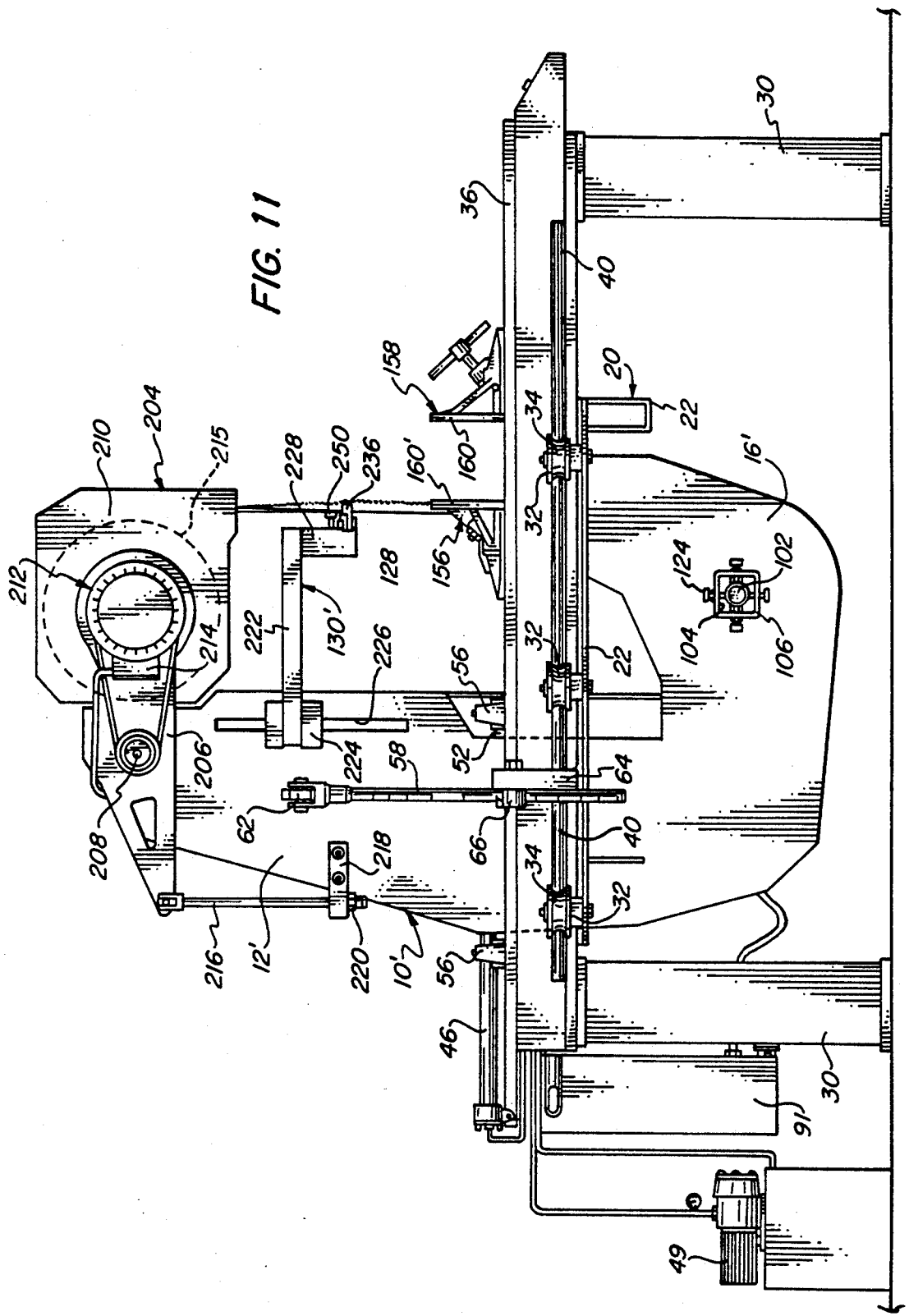

VERTICAL MITERING BAND SAW

BACKGROUND OF THE INVENTION

This invention relates to vertical mitering band saws, and apparatus used in connection therewith.

Band saws that operate in a vertical plane, but that are tiltable through a range of angles for the production of mitre cuts in workpieces of metal and other materials, are well known in the art. Presently available saws of this type are however often found to lack sufficient stability, rigidity, and freedom from vibration, and to afford inadequate levels of accuracy and efficiency in cutting, responsiveness to variations in loading, and facility in adjusting cutting angles and blade tension. Also wanting in such machines are optimal systems for supporting and moving linearly the sawing mechanism, and for securing the workpiece.

SUMMARY OF THE INVENTION

Accordingly, it is the broad object of the present invention to provide a vertical mitering band saw machine that avoids at least some of the above-noted deficiencies, and to provide apparatus for such a machine by which those ends are promoted.

It has now been found that certain of the foregoing and related objects of the invention are attained by the provision of a mitering band saw machine comprising, in combination, a table, a generally C-shaped column, means for pivotably mounting the column on the table, means for affixing the column in selected orientations, pulleys for mounting a band saw blade on the column, and drive means for the pulleys. The column of the machine comprises an elongate back portion, from the opposite ends of which extend upper and lower support portions in spaced, aligned relationship to one another; at least one of the support portions is integrally formed, as a single piece, with the back portion. The column of the machine will normally be fabricated from steel or other metal plate, and the means for orienting it will generally comprise a bar that is pivotably connected to the column, cooperating with means for fastening the bar at selected points along its length.

In certain embodiments the table of the machine will comprise a base and a carriage, the latter being supported by a system of lateral rails and cooperating wheels, or equivalent guide members. The wheels will preferably be attached to the carriage of the table and will have concave, circumferential grooves; the rails on the base will provide longitudinally extending elements, of arcuate cross-section, for seated engagement by the wheels.

The machine will desirably include a vise mounted on a top wall of the base, and including a fixedly mounted jaw assembly and a disengageable jaw assembly, disposed in upstanding, confronting relationship to one another. The disengageable jaw assembly will include a fastening subassembly consisting of a jacking member, a piece attaching the jacking member to the jaw structure for pivotable movement about a laterally extending axis, and a fastening arm extending through an elongated slot in the supporting top wall. A fastening element is provided on the lower end portion of the fastening arm, and the supporting wall has a multiplicity of engagement elements on its bottom surface portion, spaced along the length of the slot. Pivoting of the fastening arm on the pivot piece will enable the fastening element to engage with and disengage from selected engagement elements, thereby permitting the jaw assembly to be affixed in each of a number of positions along the slot; coupling means on the upper end portion of the fastening arm will permit tightening of the associated jaw structure by operation of the jacking member.

One or the other of the support portions on the machine column may comprise a separate member that is pivotable about an axis transverse to the axis of tilting of the column, with means being provided for adjustably affixing the position of the separate member, thereby permitting facile tensioning of a blade mounted upon the associated pulley. The machine may in addition include a unique orienting unit, disposed on one of the support portions of the column to enable ready adjustment of the caster and camber of the associated pulley, the axle of which extends into the orienting unit. It may also utilize a novel blade guide unit, having spaced guide elements and a bearing element therebetween, the latter having a wear-resistant blade-contact face and being of variable extension from a common mounting piece, to permit positioning of the contact face at selected points along the lengths of the guide elements.

BRIEF DESCRIPTION OF THE VIEWS OF THE DRAWINGS

FIG. 6 is a fragmentary side view of the machine, taken along line 6—6 of FIG. 2;

FIG. 7 is a fragmentary view taken along line 7—7 of FIG. 3 and drawn to a scale enlarged therefrom, the Figure showing variation in the position of the disengagable jaw assembly of the vise installed on the machine;

FIG. 8 is a fragmentary, front elevational view of the vise and workpiece, taken along line 8—8 of FIG. 7;

FIG. 11 is a side elevational view comparable to FIG. 1, showing a second embodiment of the machine.

DETAILED DESCRIPTION OF THE PREFERRED EMBODIMENTS

Figure 1:
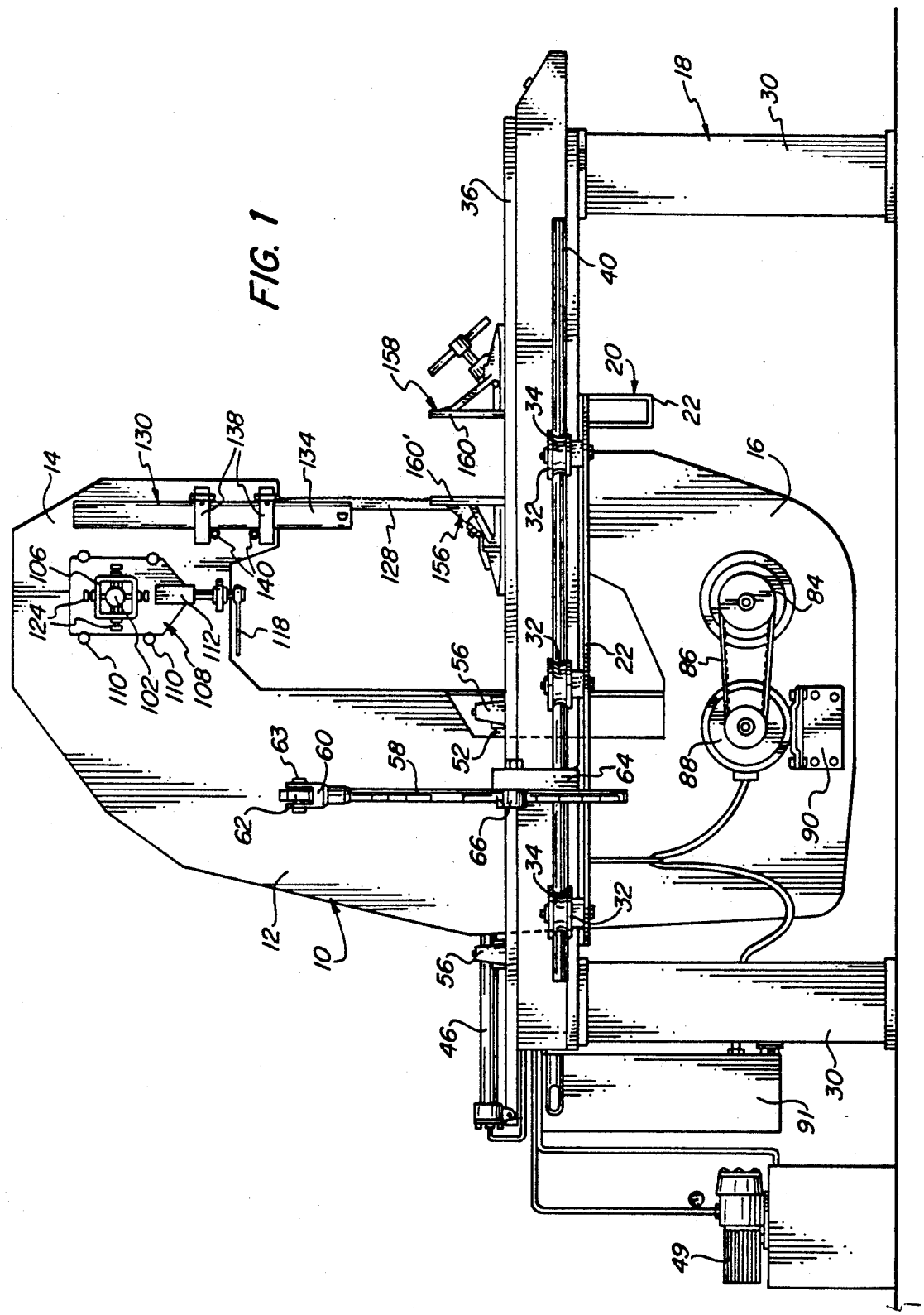
FIG. 1 is a side elevational view of a mitering band saw machine embodying the present invention.

Turning initially in detail to FIGS. 1 through 6 of the drawings, therein illustrated is a mitering band saw machine embodying the present invention and including a unitary, C-shaped column, generally designated by the numeral 10. The column 10 consists of a back portion 12, an upper support portion 14, and a lower support portion 16, all integrally formed as a single piece from sheet metal plate, typically one-inch (nominally, 2.5 centimeters) steel plate. The machine also includes a table, consisting of a base and a carriage, generally designated respectively by the numerals 18 and 20. The carriage 20 is comprised of parallel beams 22 of right-angle stock, welded to three box metal crosspieces 24, 26 and 28. Each of the angle beams 22 carries on its horizontal portion three guide wheels 32, disposed on vertical axes at equidistantly spaced locations along the length thereof, each wheel 32 being formed with a circumferential, arcuate groove 34; the wheels do not normally rotate freely (i.e., suitable blocks could be substituted), but they do offer the benefit of being manually rotatable so as to present fresh, unworn surfaces.

The base 18 consists of a horizontal top wall 36, supported by box beams 38, which are in turn supported by four legs 30; rails 40, of circular cross-section, are welded to the outer surfaces of the beams 38. As can be seen, the curvature of the rails 40 matches that of the circumferential grooves 34 in the wheels 32, so as to seat securely therewithin and mount the carriage 20 for facile sliding movement, constrained however against both lateral (i.e., horizontal) and also vertical (upward and downward) displacement. Thus, the carriage is capable of smooth, accurate, and highly stable linear movement on the base.

Figure 3:
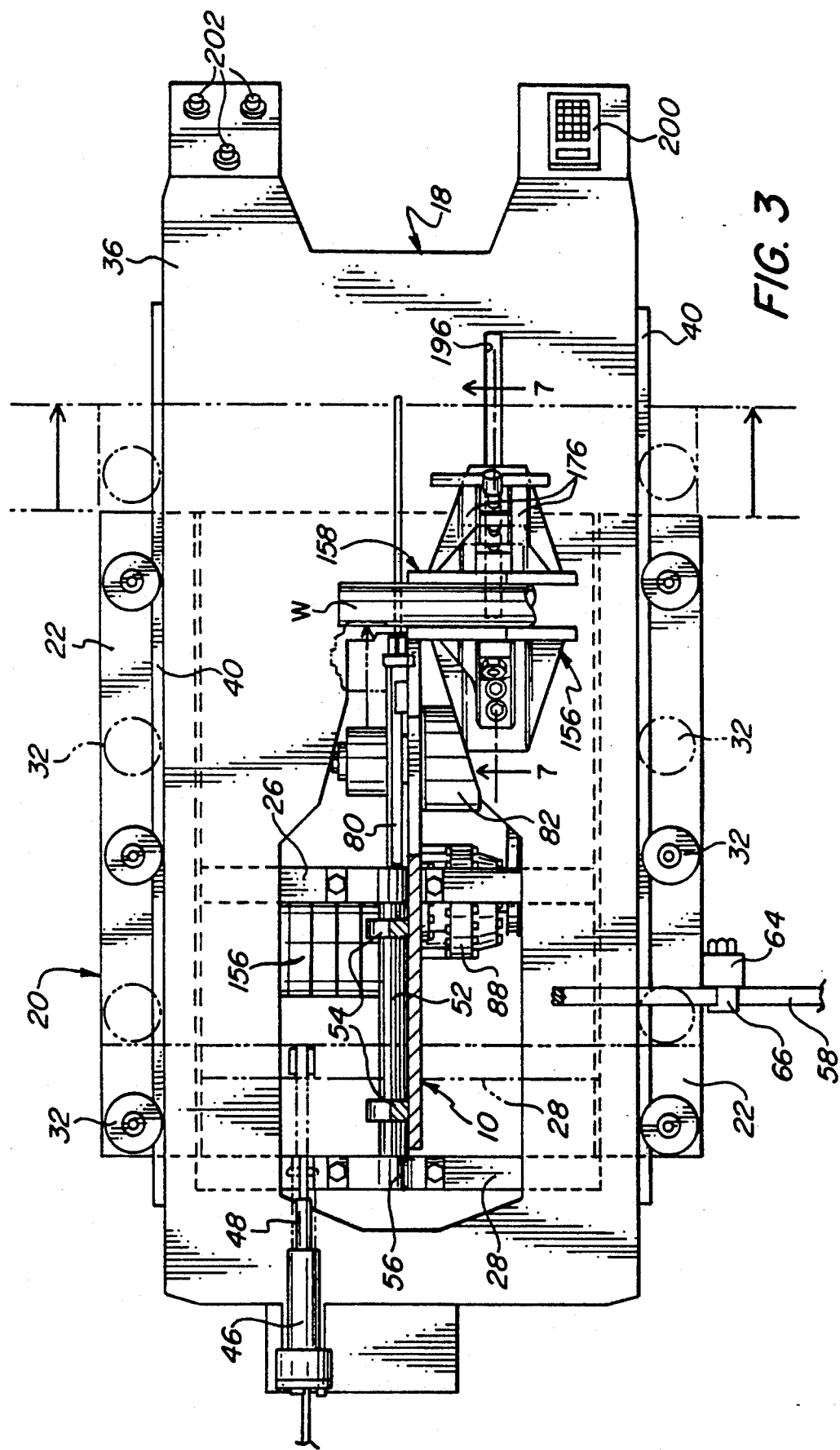
FIG. 3 is a fragmentary plan view of the machine, with portions broken away to show underlying features and with the carriage depicted in two alternate positions (by full-line and phantom-line representations)
Figure 4:
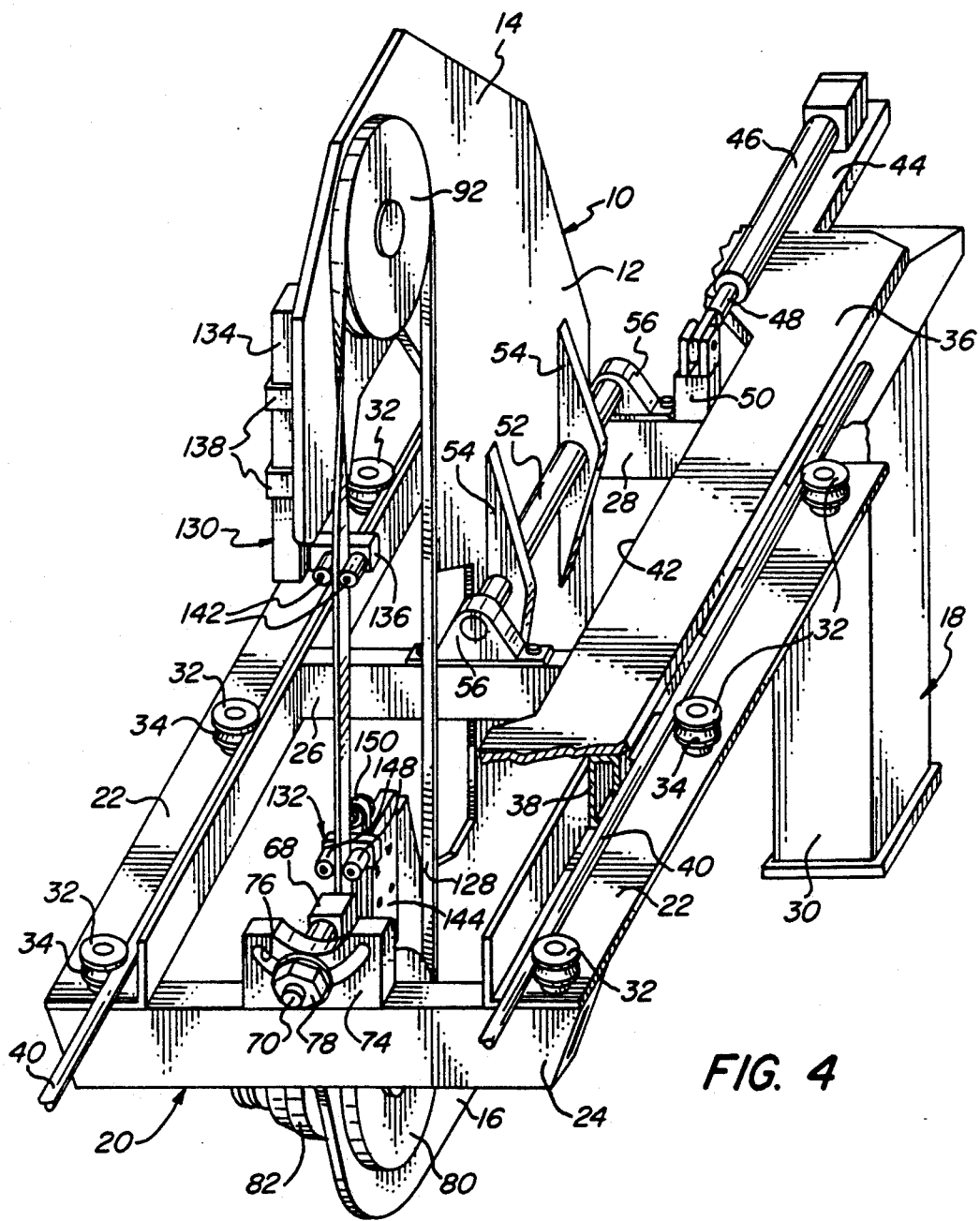
FIG. 4 is a perspective view of the machine of the preceding Figures, with portions broken away to show underlying features.

The top wall 36 has a large central opening 42 to accommodate the column 10 of the machine throughout its full range of travel on the carriage 20, and it has a rearwardly extending tail piece 44 on which is mounted the cylinder 46 of a hydraulic piston. The rod 48 of the piston has an end portion pivotably received within a clevis mount 50, which is in turn supported on the crosspiece 28 of the carriage 20. As is illustrated in FIG. 3, the carriage 20 is advanced and retracted, forwardly and rearwardly along an axis of cutting of the machine, by operation of the piston 46, 48, supplied with hydraulic fluid by the pump unit 49; it will be appreciated however that other means for driving the carriage may be substituted, such as a suitable electrical motor system, or the like.

The main pivot shaft 52 of the column 10 is disposed against one side of the back portion 12, on a generally horizontal axis extending between the upper and lower support portions 14, 16 thereof, and is mounted within a pair of flanges 54; the opposite ends of the shaft 52 are journalled in bearing mounts 56, attached to the crosspieces 26 and 28 of the carriage 20. Mitering arm or bar 58 has a clevis 60 on one end, in which is received an ear 62 attached to the column 10, the clevis and ear being pivotably interengaged by a bolt 63. A clamping assembly, comprised of a support mount 64 and a clamping element 66, is attached to the carriage 20 and receives therewithin the mitering arm 58. The arm can thus be secured in any position along its length, within the clamping assembly 64, 66, so as to fixedly vary the angle of tilt (and hence the mitre cut angle) at which the column is disposed; as will be noted from FIG. 1, the bar 58 has graduations along its length designating angular values, thereby serving to facilitate setting of the column at the desired orientation.

An upstanding fastening post 68 extends from the forward edge of the lower support portion 16 of the column 10, and is formed with an aperture 69 in its upper end. Bolt 70 passes through the aperture 69, a spacer 72, and thereafter through the arcuate slot 76 of a locking block 74 secured on top of the crosspiece 24. This arrangement provides a third point of support for the column 10 (i.e., in addition to the bearing mounts 56 in which the main pivot shaft 52 is journalled), and tightening of the nut 78 upon the bolt 70 cooperates with the arm 56 and clamping assembly 64, 66 to maintain the column in a selected orientation. It should be appreciated that the locking block assembly is not essential, albeit desirable in many instances; it would be unnecessary, for example, in a machine in which the gauge of the metal plate used for fabrication of the column is sufficiently heavy, and/or in which the spacing between the bearing mounts 56 is sufficiently great, to afford requisite stability.

The lower blade-mounting wheel or pulley 80 is affixed to a shaft (not seen), which extends through the lower support portion 16 of the column 10 and is received within a planetary gear assembly 82. A driven pulley 84 transmits power from the electric motor 88 to the gear assembly 82, by way of the drive belt 86, and thereby to the blade-supporting pulley 80. The motor is supported by motor mount 90, and electrical power is furnished thereto by connection to a suitable power supply unit 91.

Figure 10:
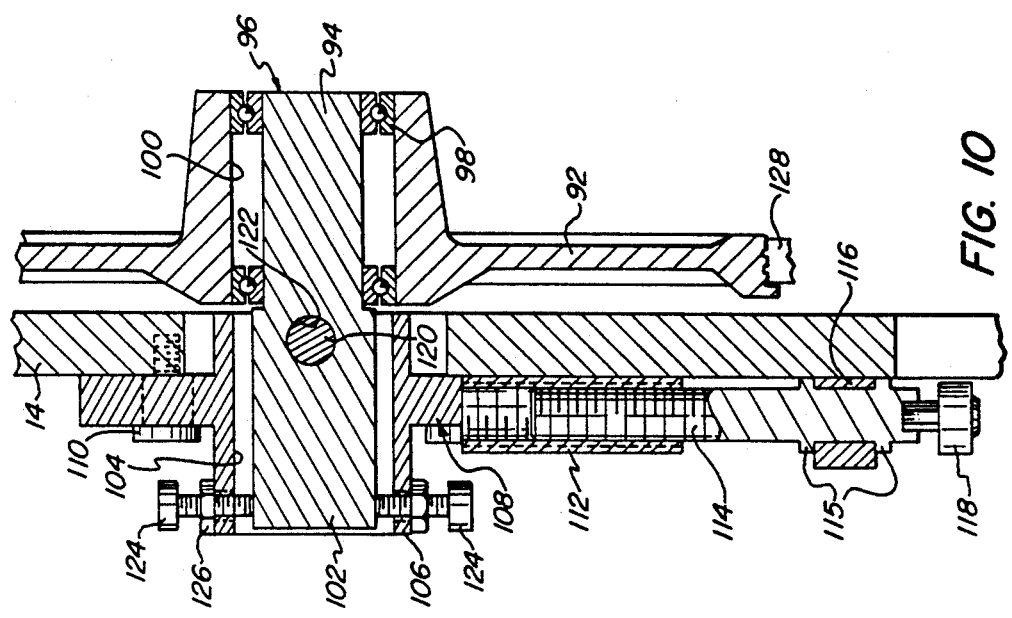
FIG. 10 is a fragmentary, sectional view taken along line 10—10 of FIG. 9.
Figure 9:
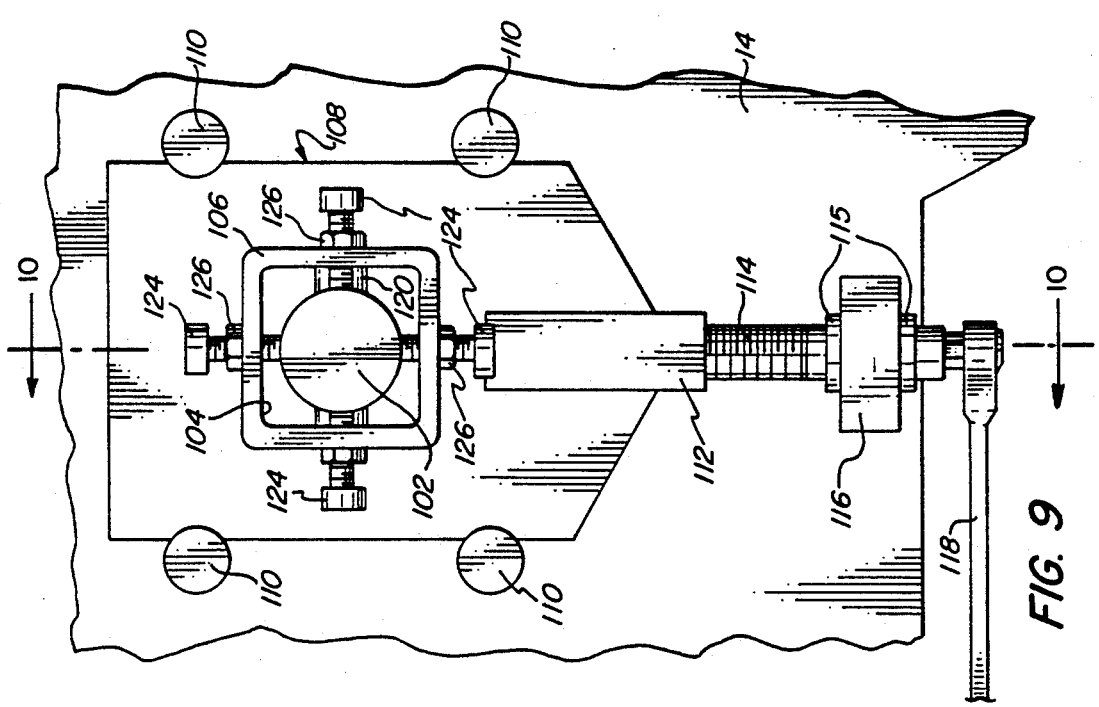
FIG. 9 is a fragmentary, side elevational view of the slide plate and associated axle-orienting unit, the assembly being mounted on the upper support portion of the column, as shown in FIG. 1 at a smaller scale.

Upper blade-mounting pulley 92 is carried upon the support portion 14 of the column 10, by means shown in detail in FIGS. 9 and 10. The pulley 92 is mounted upon the reduced-diameter portion 94 of an axle generally designated by the numeral 96, utilizing ball bearing sets 98 seated within the bore 100. The enlarged-diameter opposite end portion 102 of the axle 96 extends into the passage 104 of a square, frame-like structure 106, the latter being formed on a slide plate member, generally designated by the numeral 108. The member 108 is in turn held against the surface of the support portion 14 on the side of the column opposite to that on which the pulley 92 is disposed, being constrained to sliding movement under the enlarged head portions of four bolts 110. An internally threaded tubular sleeve element 112 is formed on the member 108, and receives the jacking screw 114, the latter having a head portion with axially spaced circumferential flanges 115, which serve to trap the screw 114 within a retaining collar 116 provided on the column 10. A ratchet arm 118 is splined to the jacking screw 114, rotation of which raises and lowers the plate member 108 to adjust the tension on the saw blade 128 trained over the associated pulley 92.

Shaft 120 spans the frame portion 106 of the slide plate member 108 and is received within a transverse bore 122 extending through the wheel axle 96, permitting limited pivoting of the axle in a vertical plane. Four adjustment screws 124 project radially into the passage 104 (taken with respect to its longitudinal axis) and into contact with the enlarged end portion 102 of the axle; they carry locking nuts 126 to affix them in selected positions. As will be appreciated, the frame 106, shaft 120, and screws 124 constitute an axle-orienting unit by which the caster and camber of the wheel 92 can readily be varied, as required.

Upper and lower guide assemblies, generally designated by the numerals 130 and 132, respectively, serve to twist and return the blade 128 from and to its flat running position over the pulleys 80, 92, so as to dispose forwardly the tooth-bearing edge of the blade, for cutting. The upper guide assembly 130 consists of an L-shaped member, including a supporting leg 134 and a mounting leg 136, the leg 134 being adjustably disposed beneath clamps 138 and laterally constrained by guide elements 140. A pair of guide rollers 142 extend forwardly from the mounting leg 136, in spaced, parallel relationship to one another; they serve to turn the blade 128 received therebetween through an angle of 90° as it leaves the upper pulley 92.

The lower guide assembly 132 consists of a mounting plate 144 secured to the lower support portion 16 of the column 10, to which plate is attached a base block 146 carrying a pair of spaced, forwardly extending parallel rollers 148. They serve to maintain the desired orientation of the blade throughout the span of cutting, and to then permit the blade to return to its original, flat orientation against the circumferential surface of the lower pulley 80. The mounting plate 144 also carries a short post 150, in which is threadably engaged a back-pressure guide screw 152 having a wear-resistant face (e.g., of silicon carbide). It will be appreciated that the screw 152 is of adjustable extension from the post 150, enabling it to be brought to bear upon the back edge of the blade 128, in turn enabling optimal positioning of the blade and affording resistance to deflection upon engagement by the workpiece.

Figure 2:
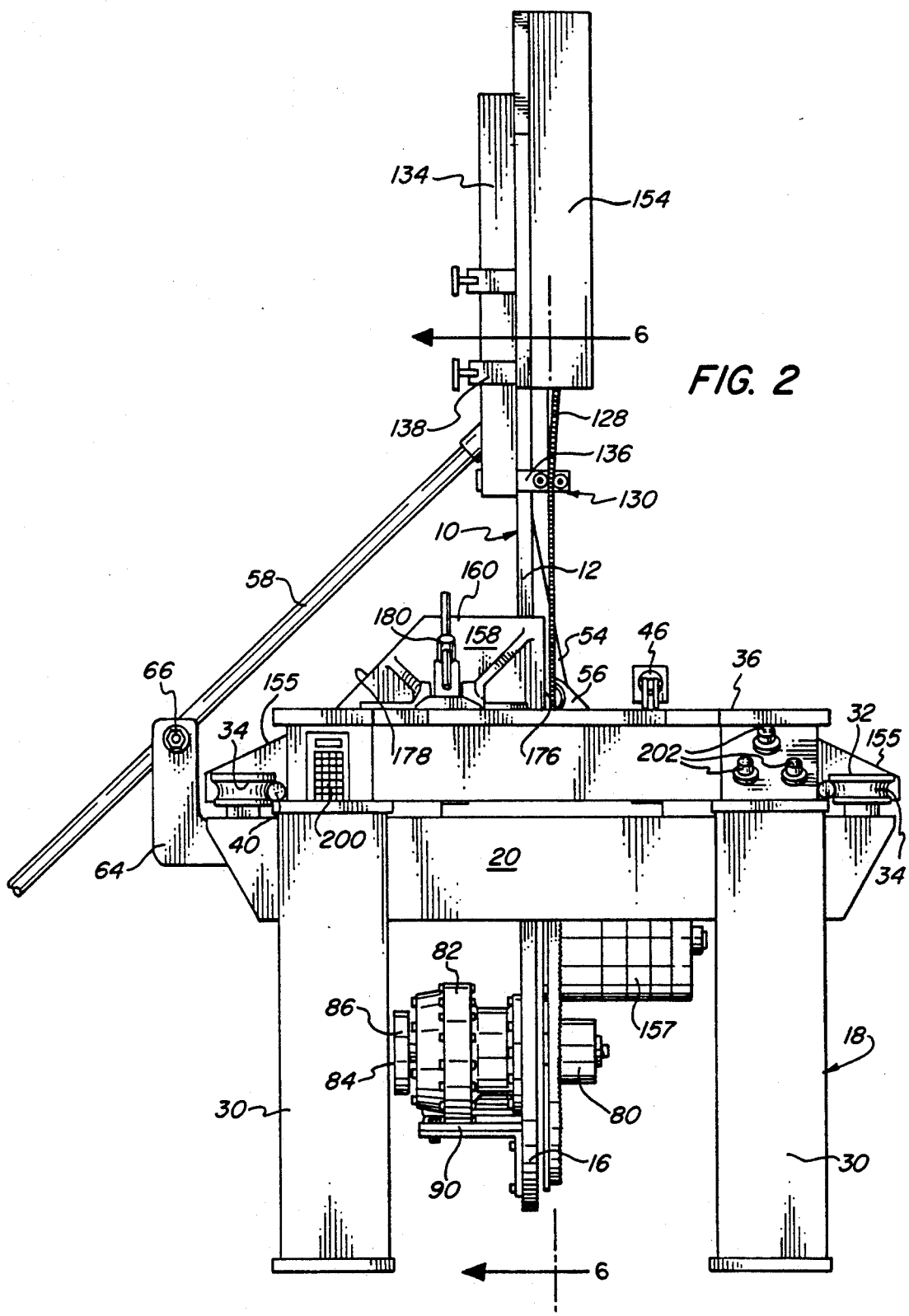
FIG. 2 is a forward end view of the machine of FIG. 1.
Figure 5:
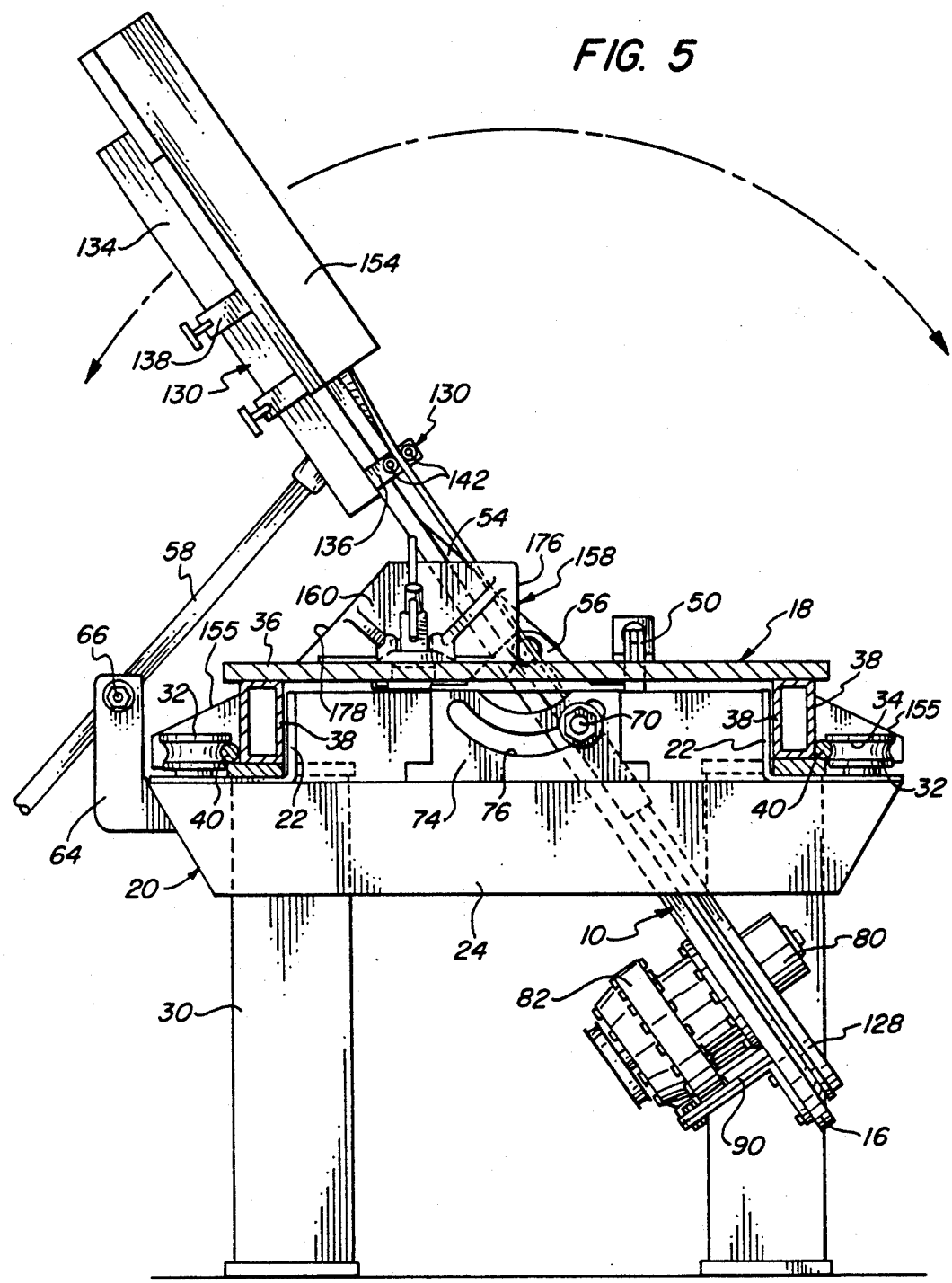
FIG. 5 is a front view of the machine, taken in partial section and illustrating the blade-mounting column of the machine titled to an orientation displaced from vertical.

As seen in FIGS. 2 and 5, a guard 154 is attached at the front of the column 10, providing a physical barrier to protect the operator against inadvertent contact with the upper pulley and against injury in the event of blade breakage; wheel guards 155 are also shown therein. In addition, a counterweight assembly 157 is provided on the lower support portion 16 of the column, to facilitate tilting and maintenance of column orientation.

Referring now in particular to FIGS. 7 and 8, therein illustrated is a unique vise employed in the machine for securing a workpiece "W" on the top wall 36. It consists of a fixed jaw assembly, generally designated by the numeral 156, and a displaceable jaw assembly, generally designated by the numeral 158. Both of the assemblies 156, 158 employ a jaw structure that consists of an upright, forward portion 160, 160' (the difference therebetween being described hereinbelow), a rearward portion 162, and connecting lateral portions 164, which cooperatively define an internal opening 166. The fixed assembly 156 is seated within a recess 168 machined into the upper surface portion of the wall 36, and a cleat 170 is disposed within the opening 166 thereof and is secured to the plate 36 by bolts 172. A clamping screw 165 extends through the oblique portion 167 of the cleat 170, and bears upon the base element 169 of the jaw structure to secure it in place within the recess 168.

The displaceable jaw assembly 158 is mounted in confronting relationship to fixed assembly 156. The lateral portions 164 of the jaw structures 160, 160' have aligned circular apertures 174 formed therein (only one of which is visible in FIG. 7), which serve to journal the opposite ends of a pivot piece 177, for rotation about a normally horizontal axis. A jacking screw 180 is secured by a bolt 182 to the pivot piece 178, and in turn carries a fastening arm 184, received within the threaded passage 188 of the upper collar portion 186 provided thereon. The lower portion 190 of the fastening arm 184 mounts a transverse locking pin 192, and a handle rod 194 extends through the outer head portion of the jacking screw 180.

The fastening arm 184 extends through an elongated slot 196 formed through the top wall 36 of the base, along the opposite side margins of which slot are provided laterally paired rows of lugs 198 (which may be provided by short bolts), projecting downwardly from the underside of the wall 36. The lugs 198 serve to engage the opposite ends of the transverse pin 192 of the fastening arm 184, as is best seen in FIG. 8. It will thus be evident that coarse adjustment of the spacing between the jaw structures is readily accomplished by moving the displaceable assembly 158 to the approximate position desired, and thereupon pivoting the arm 184 to engage the pin 192 behind the most proximate pair of lugs 198. By turning the handle 194, the jacking screw 180 will advance the jaw portion 160 of the assembly 158 toward the corresponding portion of the assembly 156, ultimately to tightly clamp the workpiece "W" therebetween. Upon release of the workpiece, the pin 192 can be disengaged by pivoting of the fastening arm 184, as shown in the phantom-line representation of FIG. 7.

The upright portions 160, 160' of the jaw structures are each formed with a vertical edge 176 on one side, and a 45° bevel edge 178 on the other; these edges are oppositely disposed on the portions 160, 160', establishing a mirror-image relationship therebetween. The jaws are of course employed with their like edges in registry, thus affording maximum support for the workpiece against cutting forces, irrespective of saw blade orientation. The positions of the jaw structures on the top wall can be interchanged (i.e., to reverse the relationship shown in FIG. 8, and thereby to dispose the bevel edges 178 proximate the blade 128), with the fastening arm and jacking assembly being taken from one and placed into the other. To do so, the jacking screw 180 and the locking arm 184 are removed from the pivot piece 178 by extraction of the screw 182, following which the pivot piece can be withdrawn from the apertures 174 in the lateral portions 176 of the jaw. It will be appreciated that the slot 196 in the top wall 36 affords the added benefit of permitting the exit of chips and other foreign matter; vises in machines of this kind are conventionally mounted in T-slots and the like, wherein the accumulation of such debris is problematic.

Operation of the saw machine will be readily evident. The column 10 is set at the desired tilt angle by use of the graduated bar 58 and the clamping mechanism 64, 66, and the workpiece is secured in the vise, as described. The electric motor 88 is then actuated by introduction of the desired revolutions-per-minute value, using the electronic control device 200 provided at the front of the machine, to drive the blade at the selected rate of speed. The three push buttons 202, provided on the opposite side of the machine, are then used to advance, retract, and arrest movement of the carriage.

FIG. 11 of the drawings shows a modification of the saw machine in which the upper support portion is an articulated assembly, generally designated by the numeral 204. Common numbers are utilized to designate parts and components that are the same as, or that correspond to, those of the machine hereinbefore described.

In the "overdriven" form of the machine shown in FIG. 11, the unitary section of the column, generally designed by the numeral 10', is of generally L-shaped configuration and includes a back portion 12' and a lower support portion 16', which portions may be integrally formed from a single piece of metal plate; the column 10' is supported upon the carriage of the table in the manner hereinabove described. It will be appreciated that the lower blade wheel (not visible) is mounted upon the support portion 16', utilizing an axle-orienting unit of the character employed on the upper support portion 14 of the previous embodiment, constituting a feature of the slide plate assembly 108 and illustrated in detail in FIGS. 9 and 10.

The upper support portion assembly 204 of the machine of FIG. 11 includes a mounting arm 206, pivotably supported near the upper end of the block portion 12' by mounting structure 208, and carrying on its forward end a generally rectangular plate 210. An in-line motor and gearbox combination, generally designated by the numeral 212, is mounted on one side of the plate 210 and has an associated electrical junction box 214 connected to the power supply unit 91. The upper blade pulley 215 (shown in dotted line) is disposed on the opposite side of the plate 210, and is mounted directly on a drive shaft extending from the motor/gearbox combination 212. Tie rod 216 is connected at its upper end to the rearward portion of the pivot arm 206; the rod 216 is received within a mounting bracket 218, and is threaded at its lower end to receive a nut 220. Adjustment of the position of the nut 220 on the threaded portion of the rod 216 will of course vary the angular orientation of the arm 206 about the mount 208, and thereby the tension on the blade 128. It will be appreciated that this assembly may be considered less desirable than the slide plate arrangement of FIG. 1, due to the substantially greater weight entailed.

The upper blade guide assembly, generally designated by the numeral 130', consists of an L-shaped support that includes a horizontal leg 222, mounted at its rearward end upon a slide plate 224, and a vertical leg 228 at its forward end. A fastener (not visible) extends from the plate 224, and is received within the vertical slot 226 formed through the column portion 10', enabling the slide plate 224, and hence the assembly 130', to be affixed at any level along the length of the slot 226.

Figure 12:
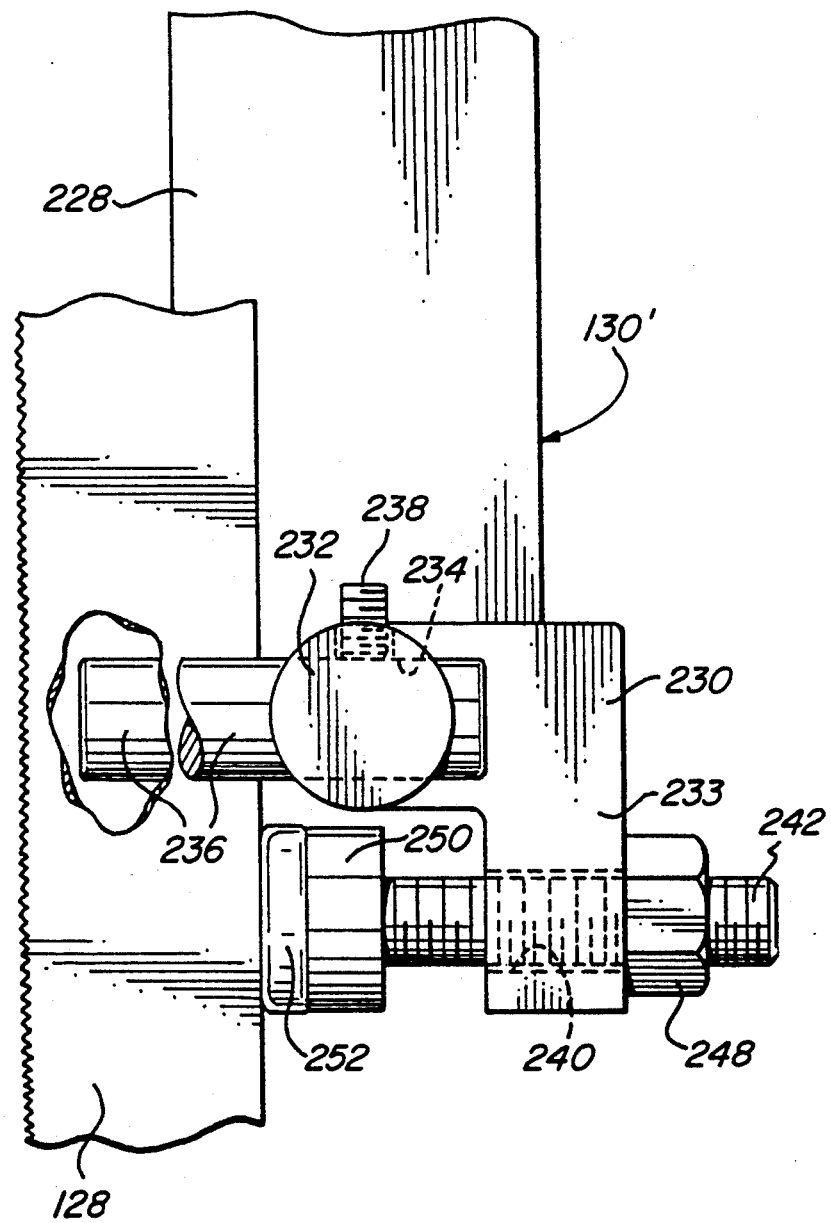
FIG. 12 is a fragmentary, side elevational view of a blade guide unit utilized in the machine of FIG. 11, drawn to an enlarged scale and having portions of broken away to show underlying structure.

With particular reference now to FIG. 12, the assembly 130' is seen to include a mounting piece 230 which is attached to the vertical leg 228 and has cylindrical boss elements 232 (only one of which is visible) projecting laterally from its opposite sides. A passage 234 of circular cross section extends through each boss element 232, and serves to slidably seat a guide cylinder 236; the cylinders 236 are of variable extension from the mounting piece 230, and can be affixed in any selected position by tightening of the associated set screw 238.

The mounting piece 230 also has a depending portion 233, which is formed with a threaded passage 240 in which is engaged the shank 242 of a back-pressure screw member, the position of which may be adjusted forwardly and rearwardly and maintained by tightening of the locking nut 248. An element 252 of wear-resistant material is carried on the forward face of the head portion 250 of the screw, to bear upon the back edge of the blade 128 and thereby enable positional adjustment and control of the level of back-pressure force exerted thereupon.

Unlike similar equipment known in the art, it should be noted that the present saw machine has the drive motor, and associated gearing, mounted directly upon the column; this is very beneficial from the standpoints of both operating efficiency and stability. By virtue of the resultant close proximity of the prime mover to the driven, blade-carrying pulley the physically extended and complex mechanical transmission systems that are normally interposed between a driven pulley and the prime mover are thereby eliminated, together with the associated energy losses. Moreover, the high-speed rotation of the masses of which the motor and the gearbox are comprised produce substantial moments of inertia (gyroscopic effects) and levels of angular momentum, both of which impart stability to the column and thereby significantly enhance the performance of the saw. It is believed that particular benefit may be realized in this regard when a gear assembly, such as a planetary gearbox, is mounted in-line (i.e., coaxially) with the motor and driven pulley, as in the overdriven machine illustrated in FIG. 11. And in the preferred embodiments of the invention, the motor employed may utilize a so-called transistor invertor, which is capable of maintaining a selected blade RPM and torque; other systems of similar capability may of course be substituted, if so desired.

Thus, it can be seen that the present invention provides a novel vertical mitering band saw machine that substantially avoids the deficiencies of prior art machines, as first noted hereinabove, and it provides novel apparatus by which those ends are promoted.

Having thus described the invention, what is claimed is:

1. A mitering band saw machine,
   a table;
   a generally C-shaped column comprising an elongate back portion with opposite ends, and upper and lower support portions extending forwardly from said opposite ends of said back portion in spaced, aligned relationship with one another, at least one of said support portions being integrally formed, as a single piece, with said back portion, said back portion having opposite sides and being substantially greater in width, from front-to-rear, than it is in thickness;
   means for mounting said column on said table for pivotable movement about a horizontal axis extending along one side of said back portion and between said support portions of said column;
   means operatively connected to said column for affixing it in each of a range of orientations pivoted about said horizontal axis;
   a pair of pulleys for mounting a band saw blade in a position disposed to said one side of said back portion and substantially in the plane in which said horizontal axis lies, one of said pulleys being rotatably mounted on each of said support portions of said column; and
   drive means mounted on one of said support portions and operatively connected to either pulley of said pair of pulleys.

2. The machine of claim 1 wherein said single piece of said column is formed from metal plate.

3. The machine of claim 1 wherein both of said support portions of said column are integrally formed as said single piece with said back portion.

4. A mitering band saw machine, comprising:
   a table;
   a column comprising an elongate back portion with opposite ends, and upper and lower support portions extending forwardly from said opposite ends of said back portion in spaced, aligned relationship with one another;
   means for mounting said column on said table for pivotable movement about a horizontal axis extending between said support portions of said column;

means operatively connected to said column for affixing it in each of a range of orientations pivoted about said horizontal axis; and a pair of pulleys for mounting a band saw blade substantially in the plane in which said horizontal axis lies, one of said pulleys being rotatably mounted on each of said support portions of said column, said means for affixing comprising a bar having opposite ends, and a fastening member operatively mounted on said table, said bar being connected at one end of said column for pivotal movement about a second horizontal axis parallel to said first-mentioned horizontal axis, and being received by said fastening member for fastening said bar at selected positions along its length, to thereby so affix said column, said bar having graduations along its length to facilitate setting of said column at a desired orientation.

5. The machine of claim 1 wherein said table comprises a base having opposite side portions, a carriage having opposite lateral portions, and mounting means mounting said carriage on said base for movement, in a horizontal plane and along an axis of cutting, with said lateral and side portions thereof, on opposite sides of said table, disposed adjacent one another; said mounting means comprising a pair of horizontally extending rails, one attached on each side of said table to one of said lateral portion of said carriage and said side portion of said base, and a multiplicity of guide members, at least two of said guide members being mounted on each side of said table, in spaced relationship to one another and in engagement with said rail disposed thereat, on the other of said lateral portion and said side portion, each of said guide members having a concave groove extending therealong, said rails being contoured so as to seat snugly within said grooves of said guide members and to engage the same against both vertical and also horizontal displacement.

6. The machine of claim 5 wherein said column is mounted on said carriage for movement therewith, wherein said guide members are wheels attached to said carriage with the central axes thereof oriented vertically, wherein said grooves of said wheels are of arcuate cross section and extend circumferentially thereabout, and wherein said rails are attached to said base and are contoured to provide elements of arcuate cross section extending longitudinally therealong, for engagement by said wheels.

7. The machine of claim 1 additionally including a vise on said table for securing a workpiece.

8. The machine of claim 7 wherein said carriage has a top wall with upper and lower surface portions and an elongate slot therethrough, and wherein said vise comprises a fixedly mounted jaw member and a disengagable jaw assembly disposed on said top wall in generally upstanding confronting relationship to one another; said jaw assembly comprising a jaw piece movably seated on said top wall to vary its spacing from said jaw member, and a fastening subassembly comprising a jacking member, a pivot piece attaching said jacking member to said jaw piece for pivotal movement about a laterally extending axis, and a fastening arm extending through said slot and having an upper end portion above said top wall and a lower end portion therebelow, said lower end portion of said arm having a fastening element thereon, and said upper end portion of said arm having coupling means thereon engaging said jacking member, for access from above said upper surface portion, and cooperating said jaw member to permit variation of the spacing between said arm and said pivot piece by operation of said jacking member; said top wall having a multiplicity of engagement elements on said lower surface portion thereof at locations spaced along said slot and accessible to said lower end portion of said fastening arm, said engagement elements being engagable by said fastening element on said lower end portion of said arm to disengageably affix said jaw assembly, in each of a multiplicity of positions along said slot, by pivoting said arm on said pivot piece so as to effect engagement and disengagement between said fastening element and selected engagement elements.

9. The machine of claim 8 wherein said jacking member of said fastening subassembly is a screw, wherein said coupling means on said upper end portion of said fastening arm defines a threaded passageway in which said screw is threadably engaged, wherein said engagement elements are lugs projecting downwardly from said lower surface portion of said top wall, and wherein said fastening element is a laterally extending piece that is insertable between said lugs.

10. A mitering band saw machine, comprising:
a table;
a generally C-shaped column comprising an elongate back portion with opposite ends, and upper and lower support portions extending forwardly from said opposite ends of said back portion in spaced, aligned relationship with one another, one of said support portions being integrally formed, as a single piece, with said back portion, said back portion having opposite sides and being substantially greater in width, from front-to-rear, than it is in thickness;
positioning means operatively connected to said column and the other of said support portions;
means for mounting said column on said table for pivotable movement about a horizontal axis extending along one side of said back portion and between said support portions of said column;
means operatively connected to said column for affixing it in each of a range of orientations pivoted about said horizontal axis;
a pair of pulleys for mounting a band saw blade in a position to said one side of said back portion and substantially in the plane in which said horizontal axis lies, one of said pulleys being rotatably mounted on each of said support portions of said column; and
drive means mounted on one of said support portions and operatively connected to either pulley of said pair of pulleys, said other of said support portions comprising a separate member mounted upon said back portion for pivotal movement about a third horizontal axis transverse to said first-mentioned horizontal axis, said positioning means adjustably affixing said other support portion in a selected position pivoted about said third axis.

11. The machine of claim 10 wherein said other support portion is said upper portion, and wherein said drive means is mounted thereon.

12. A mitering band saw machine, comprising:
a table;
a column comprising an elongate back portion with opposite ends, and upper and lower support portions extending forwardly from said opposite ends of said back portion in spaced, aligned relationship with one another;

means for mounting said column on said table for pivotable movement about a horizontal axis extending between said support portions of said column;

means operatively connected to said column for affixing it in each of a range of orientations pivoted about said horizontal axis; and a pair of pulleys for mounting a band saw blade, one of said pulleys being rotatably mounted on each of said support portions of said column, each of said pulleys being mounted on an axle, at least one of said axles extending through the associated support portion of said column and being supported thereby, and said associated support portion having opposite sides and an axle-orienting unit on one of said sides thereof, said orienting unit comprising a support member and a multiplicity of adjustment elements, said adjustment elements being supported by and projecting from said support member, and being disposed to act in effectively opposing radial directions with respect to an axis through said support member, the lengths of said adjustment elements projecting from said support member being variable in said radial directions, said one axle having a portion extending into said support member of said orienting unit and disposing the pulley mounted thereon on the other of said opposite sides of said associated support portion, whereby the orientation of said one axle can be adjusted by variation of the projecting lengths of said adjustment elements.

13. The machine of claim 12 wherein said support member of said orienting unit comprises a frame into which said one axle portion extends, wherein each of said adjustment elements is a screw threadably engaged within said frame and bearing upon said one axle portion, wherein said orienting unit includes a shaft extending on a horizontal axis transverse to said axis through said support member, and wherein said one axle portion has a transverse bore in which said shaft is received for pivotable movement of said one axle thereon.

14. The machine of claim 12 wherein said associated support portion has a mounting plate adjustably mounted thereon for movement along a common axis extending between said support portions of said column, and has means for selectively adjusting the position of said mounting plate along said common axis, said axle-orienting unit being mounted on said mounting plate.

15. The machine of claim 1 wherein a blade guide unit is operatively mounted upon said column, said guide unit comprising a mounting piece, a pair of mutually spaced guide elements extending parallel to one another and forwardly from said mounting piece in a plane generally perpendicular to the longitudinal axis of said back portion of said column, and an adjustable bearing element extending forwardly from said mounting piece in a plane effectively intermediate said guide elements, said bearing element having a forward end on which is provided a blade contact face of wear resistant material, and being of variable extension from said mounting piece to permit positioning of said contact face at selected points along the lengths of said guide elements.

16. A band saw machine, comprising:
a table;
a column;
means for mounting said column on said table in a generally vertical orientation; and means for operatively mounting a band saw blade on said column, said table comprising a base having opposite side portions, a carriage having opposite lateral portions, and mounting means mounting said carriage on said base for movement in a horizontal plane and along an axis of cutting, with said lateral and side portions thereof, on opposite sides of said table, disposed adjacent one another; said mounting means comprising a pair of horizontally extending rails, one attached on each side of said table to one of said lateral portion of said carriage and said side portion of said base, and a multiplicity of guide members, at least two of said guide members being mounted on each side of said table, in spaced relationship to one another and in engagement with said rail disposed thereat, on the other of said lateral portion and said side portion, each of said guide members having a concave groove extending therealong, said rails being contoured so as to seat snugly within said grooves of said guide members and to engage the same against both vertical and also horizontal displacement.

17. The machine of claim 16 wherein said guide members are wheels attached to said carriage with the central axes thereof oriented vertically, wherein said grooves of said wheels are of arcuate cross section and extend circumferentially, and wherein said rails are attached to said base and are contoured to provide elements of arcuate cross section extending longitudinally therealong, for engagement by said wheels, said wheels being disposed outwardly of said rails.

18. A band saw machine, comprising:
a table, including a base and a carriage movably mounted thereon;
a column;
means for mounting said column on said table;
means for operatively mounting a band saw blade on said column for cutting on an axis of cutting; and
a vise on said table for securing a workpiece; said table having a top wall with upper and lower surface portions and an elongate slot therethrough, said vise comprising a fixedly mounted jaw member and a disengagable jaw assembly disposed on said top wall in generally upstanding confronting relationship to one another; said jaw assembly comprising a jaw piece movably seated on said top wall to vary its spacing from said jaw member, and a fastening subassembly comprising a jacking member, a pivot piece attaching and jacking member to said jaw piece for pivotal movement about a laterally extending axis, and a fastening arm extending through said slot and having an upper end portion above said top wall and a lower end portion therebelow, said lower end portion of said arm having a fastening element thereon, and said upper end portion of said arm having coupling means thereon engaging said jacking member, for access from above said upper surface portion, and cooperating with said jacking member to permit variation of the spacing between said arm and said pivot piece by operation of said jacking member; said top wall having a multiplicity of engagement elements on said lower surface portion thereof at locations spaced along said slot and accessible to said lower end portion of said fastening arm, said engagement elements being engagable by said fastening element on said lower end portion of said arm to disengageably affix said jaw assembly, in each of a multiplicity of positions along said slot, by pivoting said arm on said pivot piece so as to effect engagement and disengagement between said fastening element and selected engagement elements.

19. The machine of claim 18 wherein said jacking member of said fastening subassembly is a screw, wherein said coupling means on said upper end portion of said fastening arm defines a threaded passageway in which said screw is threadably engaged, wherein said engagement elements are lugs projecting downwardly from said lower surface portion of said top wall, and wherein said fastening element is a laterally extending piece that is insertable between said lugs.

20. A mitering band saw machine, comprising:
   a table;
   a generally C-shaped column comprising an elongate back portion with opposite ends, and upper and lower support portions extending forwardly from said opposite ends of said back portion in spaced, aligned relationship with one another;
   means for mounting said column on said table for pivotable movement about a horizontal axis extending between said support portions thereof;
   means operatively connected to said column for affixing it in each of a range of orientations pivoted about said horizontal axis;
   a pair of pulleys for mounting a band saw blade, one of said pulleys being rotatably mounted on each of said support portions of said column; and
   drive means, including a motor and a gear assembly, mounted on one of said support portions and operatively connected to either pulley of said pair of pulleys, both said gear assembly and also said motor being disposed coaxially with said either pulley.

21. A mitering band saw machine, comprising:
   a table;
   a column comprising an elongate back portion with opposite ends, and upper and lower support portions extending forwardly from said opposite ends of said back portion in spaced, aligned relationship with one another, said back portion having opposite sides and being substantially greater in width, from front-to-rear, than it is in thickness;
   means for mounting said column on said table for pivotable movement about a horizontal axis extending along one side of said back portion and between said support portions of said column;
   means operatively connected to said column for affixing it in each of a range of orientations pivoted about said horizontal axis;
   a pair of pulleys for mounting a band saw blade in a position disposed to said one side of said back portion and substantially in the plane in which said horizontal axis lies, one of said pulleys being rotatably mounted on each of said support portions of said column; and
   drive means operatively connected to either pulley of said pair of pulleys.

22. The machine of claim 21 wherein a blade guide unit is operatively mounted upon said column, said guide unit comprising a mounting piece, and a pair of mutually spaced guide elements extending parallel to one another and forwardly from said mounting piece in a plane generally perpendicular to the longitudinal axis of said back portion.

* * * * *